(No Model.)

G. B. BOOMER.
EXTRACTING CANE JUICE.

No. 269,628. Patented Dec. 26, 1882.

WITNESSES:
Chas. Wahlers.
William Miller

INVENTOR
George B. Boomer
BY Van Santvoord & Hauff
ATTORNEYS

UNITED STATES PATENT OFFICE.

GEORGE B. BOOMER, OF NEW YORK, N. Y.

EXTRACTING CANE-JUICE.

SPECIFICATION forming part of Letters Patent No. 269,628, dated December 26, 1882.

Application filed October 19, 1882. (No model.)

*To all whom it may concern:*

Be it known that I, GEORGE B. BOOMER, a citizen of the United States, residing at New York, in the county and State of New York, have invented new and useful Improvements in Extracting Cane-Juice, of which the following is a specification.

This invention is an improved process of extracting the juice from sugar-cane; and it consists in first reducing the cane to short lengths, then heating it, and finally subjecting it to pressure, so that while the cane is brought to a superior condition both for heating and pressing purposes the crystals which it contains are dissolved and a maximum yield of juice is obtained. For heating the cane it is exposed to the direct action of steam in a closed chamber, and by this means the desired purpose is accomplished in a rapid and economical manner.

It also consists in the apparatus hereinafter described, designed to facilitate the foregoing process, such apparatus being illustrated in the accompanying drawings, in which—

Figure 1:
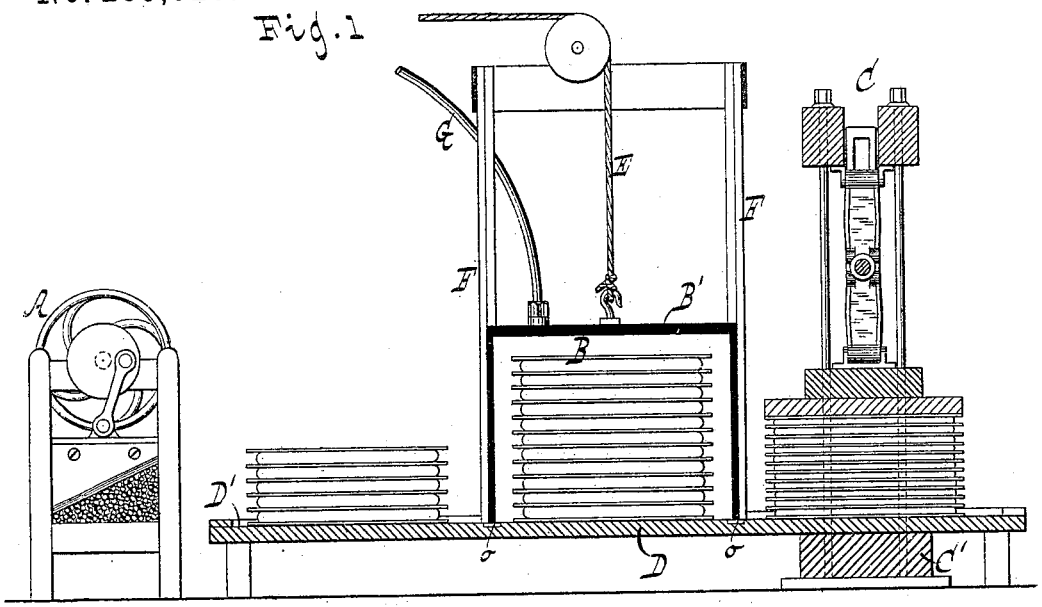
Figure 2:
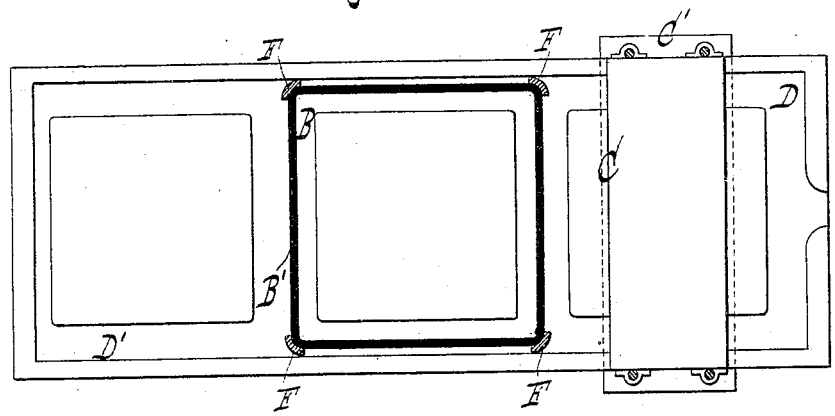

Figure 1 represents a vertical longitudinal section, and Fig. 2 a horizontal section, omitting the cutter.

Similar letters indicate corresponding parts.

In carrying out my invention I reduce the cane to short lengths or particles by passing it through a cutter, A, of proper form, or by other suitable means, and then, having laid or piled up a mass of the cut material, place it in a closed chamber, B, to which steam is admitted in such a manner that the cane is thereby heated to a proper degree of temperature for dissolving the crystals which it contains— say to 212° Fahrenheit. I then transfer the cane to a press, C, of suitable construction, and subject it to a pressure sufficient to expel the juice.

It will be readily understood that by reducing or cutting up the cane into short lengths it is brought to a condition in which it readily absorbs the heat to which it is exposed, and likewise discharges the juice in the operation of pressing it, while the effect of dissolving the sugar-crystals in the cane, as stated, is that the entire saccharine matter is in the state of juice when the cane goes to the press, and the loss hitherto incurred by the non-extraction of the crystals is avoided. The steam supplied to the chamber B is of course brought in direct contact with the cane, and it having a tendency to at once penetrate the mass, the cane is thereby heated throughout in a comparatively short space of time with a saving of time and labor. An important advantage due to the use of the press is that the cane-juice alone is extracted thereby, leaving the heavy and deleterious matter in the cane.

Across the bed of the press C extends a platform, D, on which rests a box, B', which is open at the bottom and forms the upper part of the heating-chamber B, it being located next or adjacent to the press. This box B' is left detached from the platform D, and is provided with a means for lifting it, consisting in this example of a hoisting-rope, E, while it is fitted to vertical guideways F. The platform D is extended beyond the box B' on the side opposite to the press, as at D', a sufficient distance to form a clearing on which may be laid the raw cane, ready for heating and pressing, and when a stack of cane has been laid up at that point the box B' is lifted a sufficient distance to allow the stack to be brought beneath it, which having been accomplished the box is lowered to its normal position. Then when the cane has been steamed the required length of time the box B' is again raised and the stack is shifted to the press, so that the cane may be laid up, steamed, and pressed without leaving the platform. A propelling-chain or other similar contrivance is used for shifting the stack of cane from one to the other of its positions on the platform, and a flexible tube is connected to the box B', for supplying it with steam while allowing its up-and-down movement. At the points of contact between the box B' and the platform D the latter is preferably furnished with a packing-strip, G, of india-rubber or the like, and to insure a perfectly-tight joint the box may be locked to the platform, as by means of a lever, which may also be used for raising and lowering it.

In preparing the cane for steaming and pressing it is preferred to arrange it in layers, which are enveloped in press-cloths and alternate with racks, as indicated in the drawings.

What I claim as new, and desire to secure by Letters Patent, is—

1. The process herein described of extracting juice from sugar-cane, which consists in first severing the cane into short lengths, then arranging such severed lengths in a pile or mass within a closed chamber, then subjecting the cane to the action of heat in the closed chamber until the cane is thoroughly heated and the crystals dissolved, then removing the steamed cane from the closed chamber, and finally subjecting it to pressure, substantially in the manner and for the purposes set forth.

2. The process of extracting the juice from sugar-cane, which consists in first reducing the cane to short lengths, then heating it by the direct action of steam in a closed chamber, and finally subjecting it to pressure, for the purpose set forth.

3. In an apparatus for extracting juice from sugar-cane, the combination, substantially as hereinbefore set forth, of the press, the elongated platform, and the platform-box fitted to vertical guideways, and provided with a means for raising it.

In testimony whereof I have hereunto set my hand and seal in the presence of two subscribing witnesses.

GEORGE B. BOOMER. [L. S.]

Witnesses:
W. HAUFF,
CHAS. WAHLERS.